United States Patent
Zhak et al.

(10) Patent No.: US 9,882,483 B2
(45) Date of Patent: *Jan. 30, 2018

(54) METHODS FOR MULTI-PHASE VOLTAGE REGULATOR CONTROL

(71) Applicant: Maxim Integrated Products, Inc., San Jose, CA (US)

(72) Inventors: Serhii M. Zhak, North Andover, MA (US); Brett A. Miwa, Wellesley, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/330,851

(22) Filed: Nov. 7, 2016

(65) Prior Publication Data

US 2017/0063234 A1   Mar. 2, 2017

Related U.S. Application Data

(63) Continuation of application No. 14/755,687, filed on Jun. 30, 2015, now Pat. No. 9,490,702.

(Continued)

(51) Int. Cl.
*H02M 3/158*   (2006.01)
*H02M 3/156*   (2006.01)
(Continued)

(52) U.S. Cl.
CPC .............. *H02M 3/158* (2013.01); *H02M 1/08* (2013.01); *H02M 3/156* (2013.01); *H02M 3/1584* (2013.01); *H02M 2001/0009* (2013.01)

(58) Field of Classification Search
CPC ...... H02M 1/045; H02M 1/084; H02M 3/156; H02M 3/158; H02M 3/1582; H02M 3/1584
See application file for complete search history.

(56) References Cited

U.S. PATENT DOCUMENTS 6,232,755 B1    5/2001   Zhang
9,490,702 B1 *  11/2016  Zhak ............... H02M 3/158
(Continued)

OTHER PUBLICATIONS

Liu, Pei-Hsin. Published video from Apr. 3, 2014. "Hybrid Interleaving with Adaptive PLL Loop for Constant On-Time Controlled VRM." Retrieved from <http://www.youtube.com/watch?v=FecSdSyoklo>.

(Continued)

*Primary Examiner* — Fred E Finch, III
*Assistant Examiner* — Rafael O De Leon Domenech

(57) ABSTRACT

A method of regulating voltage includes closing first and second switching devices during first and second periods in response to first and second signals, respectively. The first and second switching devices open and close to connect and disconnect first ends of first and second inductors of first and second phases of a voltage regulator to and from an input voltage, respectively. The method includes selectively generating one of the first and second signals when a third signal is in a first state; selectively setting the third signal to the first state based on a ramp voltage; resetting the ramp voltage to a predetermined reset voltage when the third signal transitions from a second state to the first state; maintaining the ramp voltage at the predetermined reset voltage for a predetermined ramp reset period after the resetting; and increasing the ramp voltage after the predetermined ramp reset period.

21 Claims, 16 Drawing Sheets

Related U.S. Application Data

(60) Provisional application No. 62/181,999, filed on Jun. 19, 2015.

(51) Int. Cl.
  *H02M 1/08* (2006.01)
  *H02M 1/00* (2006.01)

(56) References Cited

U.S. PATENT DOCUMENTS

| | | |
|---|---|---|
| 2007/0273340 A1 | 11/2007 | Miller et al. |
| 2010/0033154 A1* | 2/2010 | Cheng .................. H02M 3/1584 323/293 |
| 2011/0057632 A1 | 3/2011 | Cheng et al. |
| 2013/0038301 A1 | 2/2013 | Ouyang et al. |
| 2014/0176097 A1 | 6/2014 | Huang |
| 2014/0266117 A1 | 9/2014 | Goncalves et al. |
| 2015/0277460 A1 | 10/2015 | Liu et al. |
| 2015/0280556 A1 | 10/2015 | Bari et al. |

OTHER PUBLICATIONS

Liu, Pei-Hsin et al., "Hybrid Interleaving with Adaptive PLL Loop for Constant On-time Controlled Switching Converters," IEEE, Center for Power Electronics Systems (CPES) Conference 2014, Virginia Tech, Blacksburg, VA (Apr. 6-8, 2014), The Bradley Department of Electrical and Computer Engineering; 8 Pages.

* cited by examiner

METHODS FOR MULTI-PHASE VOLTAGE REGULATOR CONTROL

CROSS-REFERENCE TO RELATED APPLICATIONS

This application is a continuation of U.S. patent Ser. No. 14/755,687, filed Jun. 30, 2015, which claims the benefit of U.S. Provisional Application No. 62/181,999 filed on Jun. 19, 2015. The disclosure of the above application is incorporated herein by reference in its entirety.

FIELD

The present disclosure relates to voltage regulators and more particularly to systems and methods for controlling multi-phase voltage regulators.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A voltage regulator receives an input voltage and provides an output voltage to a load. A controller controls the voltage regulator to adjust the output voltage toward a target voltage.

There are several different types of voltage regulators. Some types of voltage regulators, such as buck converters, adjust the output voltage toward a target voltage that is less than the input voltage. Other types of voltage regulators, such as boost input voltage. Combination boost-buck converters are also available and can regulate the output voltage to greater than and less than the input voltage. Multi-phase voltage regulators include two or more different phases that are used to adjust the output voltage toward a target voltage.

SUMMARY

In a feature, a voltage regulator is described. The voltage regulator includes a first phase that includes: a first inductor; a first switching device that opens and closes to connect and disconnect a first end of the first inductor to and from an input voltage, a second end of the first inductor being connected to a load; and a first pulse generator that, in response to a first signal, closes the first switching device for a first period. The voltage regulator also includes a second phase that includes: a second inductor; a second switching device that opens and closes to connect and disconnect a first end of the second inductor to and from the input voltage, a second end of the second inductor being connected to the load; and a second pulse generator that, in response to a second signal, closes the second switching device for a second period. A phase manager module selectively generates one of the first and second signals when a third signal is in a first state. A comparator module selectively sets the third signal to the first state based on a ramp voltage. A ramp generator module resets the ramp voltage to a predetermined reset voltage when the third signal transitions from a second state to the first state, maintains the ramp voltage at the predetermined reset voltage for a predetermined ramp reset period after the resetting, and increases the ramp voltage after the predetermined ramp reset period. The predetermined ramp reset period is less than a predetermined minimum value of the first and second periods.

In further features, the predetermined ramp reset period is less than 1/10th of the predetermined minimum value of the first and second periods.

In further features, the ramp generator module increases the ramp voltage at a predetermined linear rate.

In further features, the ramp generator module increases the ramp voltage according to a predetermined non-linear shape.

In further features, the ramp generator module increases the ramp voltage according to a ramp rate and adjusts the ramp rate based on a period that the third signal is in the second state after the third signal transitions from the first state to the second state.

In further features, the ramp generator module decreases the ramp rate as the period that the third signal is in the second state increases.

In further features, the phase manager module generates both the first and second signals when the third signal is in the first state for greater than a predetermined period.

In further features, the phase manager module directly closes the first and second switching devices for greater than the first and second periods when the third signal is in the first state for greater than a predetermined period.

In further features, the ramp generator module sets the ramp voltage to a predetermined negative voltage that is less than the predetermined reset voltage when the third signal is in the first state for greater than a predetermined period.

In further features, a chopper module toggles a fourth signal between a first state and a second state when the third signal is in the first state for greater than a predetermined period, and maintains the fourth signal in the second state when the third signal is in the first state for less than the predetermined period. The phase manager module selectively generates one of the first and second signals each time that the fourth signal transitions to the first state.

In further features, a phase balancing module selectively adjusts at least one of the first period and the second period.

In further features, the phase balancing module selectively adjusts the first period based on a first current from the first inductor to the load.

In further features, the phase balancing module increases the first period when the first current is less than an average per-phase current to the load.

In further features, the phase balancing module increases the first period based on a difference between the first current and an average per-phase current to the load.

In further features, the phase balancing module decreases the first period when the first current is greater than an average per-phase current to the load.

In further features, the phase balancing module decreases the first period at a predetermined rate when the first current is greater than the average per-phase current to the load.

In further features, the phase balancing module decreases the first period based on a difference between the first current and the average per-phase current to the load.

In further features: an adder determines a total current based on a sum of first and second currents from the first and second inductors, respectively, to the load; and a phase voltage module determines a phase voltage based on the total current and a predetermined value. The comparator module sets the third signal to the first state when a sum of the ramp voltage and a compensation voltage is greater than the phase voltage.

In further features, a compensation voltage module determines the compensation voltage based on an output voltage to the load and a target voltage.

In further features, the compensation voltage module sets the compensation voltage based on the target voltage minus the output voltage.

In further features, the ramp generator module increases the ramp voltage according to a ramp rate and that selectively adjusts the ramp rate based on an output voltage to the load.

In a feature, a method of voltage regulating is described, the method including: in response to a first signal, using a first pulse generator, closing a first switching device for a first period, the first switching device opening and closing to connect and disconnect a first end of a first inductor of a first phase of a voltage regulator to and from an input voltage, wherein a second end of the first inductor being connected to a load; in response to a second signal, using a second pulse generator, closing a second switching device for a second period, the second switching device opening and closing to connect and disconnect a first end of a second inductor of a second phase of the voltage regulator to and from the input voltage, wherein a second end of the second inductor being connected to the load; selectively generating one of the first and second signals when a third signal is in a first state; selectively setting the third signal to the first state based on a ramp voltage; resetting the ramp voltage to a predetermined reset voltage when the third signal transitions from a second state to the first state; maintaining the ramp voltage at the predetermined reset voltage for a predetermined ramp reset period after the resetting; and increasing the ramp voltage after the predetermined ramp reset period. The predetermined ramp reset period is less than a predetermined minimum value of the first and second periods.

In further features, the predetermined ramp reset period is less than $\frac{1}{10}$th of the predetermined minimum value of the first and second periods.

In further features, increasing the ramp voltage includes increasing the ramp voltage at a predetermined linear rate.

In further features, increasing the ramp voltage includes the ramp voltage according to a predetermined non-linear shape.

In further features, increasing the ramp voltage includes the ramp voltage according to a ramp rate and adjusting the ramp rate based on a period that the third signal is in the second state after the third signal transitions from the first state to the second state.

In further features, the method further includes decreasing the ramp rate as the period that the third signal is in the second state increases.

In further features, the method further includes generating both the first and second signals when the third signal is in the first state for greater than a predetermined period.

In further features, the method further includes directly closing the first and second switching devices for greater than the first and second periods when the third signal is in the first state for greater than a predetermined period.

In further features, the method further includes setting the ramp voltage to a predetermined negative voltage that is less than the predetermined reset voltage when the third signal is in the first state for greater than a predetermined period.

In further features, the method further includes: toggling a fourth signal between a first state and a second state when the third signal is in the first state for greater than a predetermined period; maintaining the fourth signal in the second state when the third signal is in the first state for less than the predetermined period; and selectively generating one of the first and second signals each time that the fourth signal transitions to the first state.

In further features, the method further includes selectively adjusting at least one of the first period and the second period.

In further features, the selectively adjusting includes selectively adjusting the first period based on a first current from the first inductor to the load.

In further features, the selectively adjusting includes increasing the first period when the first current is less than an average per-phase current to the load.

In further features, the selectively adjusting includes increasing the first period based on a difference between the first current and an average per-phase current to the load.

In further features, the selectively adjusting includes decreasing the first period when the first current is greater than an average per-phase current to the load.

In further features, the selectively adjusting includes decreasing the first period at a predetermined rate when the first current is greater than the average per-phase current to the load.

In further features, the selectively adjusting includes decreasing the first period based on a difference between the first current and the average per-phase current to the load.

In further features, the method further includes: determining a total current based on a sum of first and second currents from the first and second inductors, respectively, to the load; determining a phase voltage based on the total current and a predetermined value; and setting the third signal to the first state when a sum of the ramp voltage and a compensation voltage is greater than the phase voltage.

In further features, the method further includes determining the compensation voltage based on an output voltage to the load and a target voltage.

In further features, the method further includes setting the compensation voltage based on the target voltage minus the output voltage.

In further features, the method further includes: increasing the ramp voltage according to a ramp rate; and selectively adjusting the ramp rate based on an output voltage to the load.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
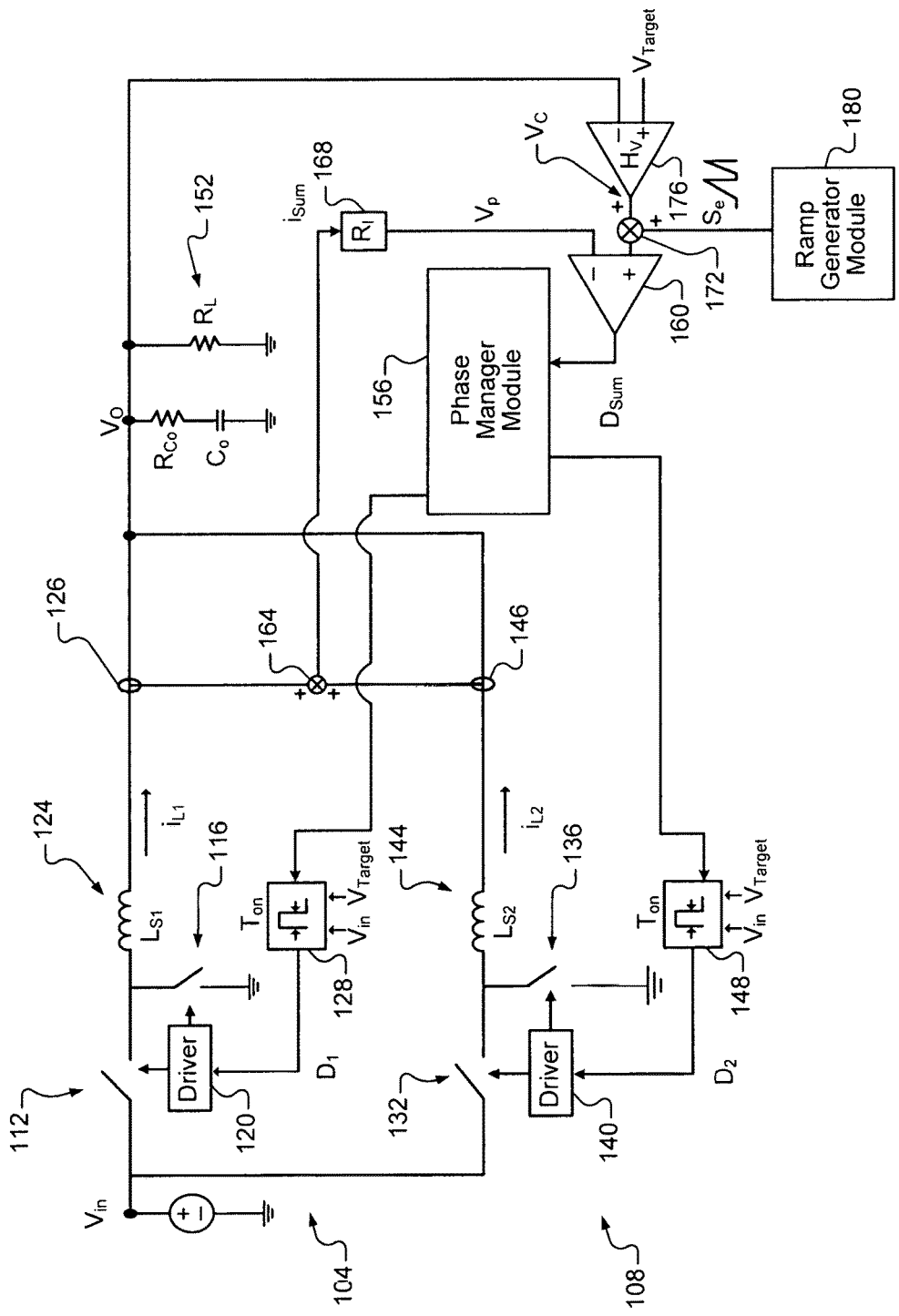
FIGS. 1-4 are functional block diagrams of example multi-phase direct current (DC) to DC voltage regulators.

Referring now to FIG. 1, a functional block diagram of an example multi-phase direct current (DC) to DC voltage regulator is presented. The multi-phase DC to DC voltage regulator includes two or more phases, such as a first phase generally indicated by 104 and a second phase generally indicated by 108. While the present application will be discussed in terms of the example of two phases, the present application is also applicable to multi-phase voltage regulators having more than two phases. For example, examples of 4-phase voltage regulators are shown in FIGS. 7A-7B, 9A-9B, and 12A-12C, as discussed further below.

The first and second phases 104 and 108 are connected in parallel and receive an input voltage ($V_{in}$). Each phase includes a pair of switching devices, a driver, an inductor, an inductor current sensor, and a pulse generator. One of the pair of switching devices of a phase selectively connects and disconnects an input end of the inductor to and from the input voltage. The other one of the switching devices of the phase connects and disconnects the input end of the inductor to and from a ground potential. In various implementations, the inductors of two, more than two, or all of the phases may be coupled. Coupled inductors use the same core. Coupled inductors are illustrated by 110 in FIG. 7B. The switching devices may be, for example, power field effect transistors (FETs) and are illustrated by 111 in FIG. 7B.

The first phase 104 includes first and second switching devices 112 and 116, first driver 120, first inductor 124, first inductor current sensor 126, and first pulse generator 128. The first switching device 112 connects and disconnects the input end of the first inductor 124 to and from the input voltage. The second switching device 116 connects and disconnects the input end of the first inductor 124 to and from the ground potential. The first inductor current sensor 126 measures a first current ($i_{L1}$) through the first inductor 124.

The second phase 108 includes third and fourth switching devices 132 and 136, second driver 140, second inductor 144, a second inductor current sensor 146, and second pulse generator 148. The third switching device 132 connects and disconnects the input end of the second inductor 144 to and from the input voltage. The fourth switching device 136 connects and disconnects the input end of the second inductor 144 to and from the ground potential. The second inductor current sensor 146 measures a second current ($i_{L2}$) through the second inductor 144.

The switches of each phase are controlled such that one of the switches is closed and the other one of the switches is open. However, before one of the switches is closed, the other one of the switches may be opened for a predetermined deadtime period before the closing. Accordingly, both of the switches may be open concurrently for a period before or after one of the switches is closed.

Additionally, both of the switches may be open concurrently for an extended period of time, for example when the load current consumption is sufficiently small such that continuously alternating operation of the switches is not required. In such an operating mode, commonly referred to as discontinuous mode (DCM) operation, the inductor current sensor may be used to optimally time the concurrent switch opening event to coincide with nominally zero current in the inductor.

Output ends of the inductors of each phase are connected to an output node and a load. A voltage at the output node is shown as $V_O$, and the load is illustrated by $R_L$ 152. The driver of a phase controls switching of the switching devices of that phase. For example, the first driver 120 controls switching of the first and second switching devices 112 and 116, and the second driver 140 controls switching of the third and fourth switching devices 132 and 136.

The first driver 120 closes the first switching device 112 and opens the second switching device 116 when a first signal (D1) is in a first state. When the first signal is in a second state, the first driver 120 closes the second switching device 116 and opens the first switching device 112. When the first signal is in a third state, the first driver 120 opens both switching devices 112 and 116.

When triggered by a phase manager module 156, the first pulse generator 128 transitions the first signal to the first state, maintains the first signal in the first state for a first ON period, then transitions the first signal to the second state. In this manner, the first pulse generator 128 generates a pulse in the first signal, the length of the pulse being the first ON period. The first ON period may be a fixed predetermined period. As discussed further below, the ON periods of the different phases may be variable, for example, to maintain a nominally constant operating frequency or mismatched, for example, to achieve phase current balancing.

The second driver 140 closes the third switching device 132 and opens the fourth switching device 136 when a second signal (D2) is in the first state. When the second signal is in a second state, the second driver 140 closes the fourth switching device 136 and opens the third switching device 132. When the second signal is in a third state, the second driver 140 opens both switching devices 132 and 136.

When triggered by the phase manager module 156, the second pulse generator 148 transitions the second signal to the first state, maintains the second signal in the first state for a second ON period, then transitions the second signal to the second state. In this manner, the second pulse generator 148 generates a pulse in the second signal, the length of the pulse being the second ON period. In the example of using fixed periods, each phase may have the same ON period. As such, the second ON period may be equal to the first ON period in various implementations.

The phase manager module 156 triggers the phases cyclically. In other words, the phase manager module 156 triggers each phase once before triggering a phase again for a second time. For example, the phase manager module 156 may trigger the first pulse generator 128 of the first phase 104, later trigger the second pulse generator 148 of the second phase 108, later trigger a pulse generator of a third phase, and so on. Once a last phase's pulse generator has been triggered, the phase manager module 156 may begin with triggering the first pulse generator 128 of the first phase 104 when necessary. While an example of triggering the phases in numeric order has been provided, the phases may be triggered in another suitable order.

The phase manager module 156 triggers a pulse generator of a phase each time when a third signal ($D_{Sum}$) output by a comparator module 160 transitions from a second state to a first state. The comparator module 160 sets the third signal to the first state when a sum of a compensation voltage ($V_C$) and a ramp voltage ($S_e$) is greater than a phase voltage ($V_p$). The comparator module 160 sets the third signal to the second state when the sum of the compensation voltage and the ramp voltage is less than the phase voltage.

A first adder 164 sums the currents flowing from each phase to the load 152 to produce a total current ($i_{Sum}$). For example, the first adder 164 sums a first phase current ($i_{L1}$) with a second phase current ($i_{L2}$) to produce the total current in the example of FIG. 1. A phase voltage module 168 multiplies the total current with a resistance value ($R_j$) (or a predetermined gain) to produce a phase voltage, which is input to the comparator module 160. The phase voltage represents a phase current.

A second adder 172 sums the compensation voltage ($V_C$) with the ramp voltage ($S_e$) and outputs the result to the comparator module 160. A compensation voltage module 176 sets the compensation voltage based on a difference between the output voltage and the target voltage. For example, the compensation voltage module 176 may set the compensation voltage equal to a product of a predetermined gain ($H_V$) and a difference value, where the difference value is equal to the target voltage minus the output voltage.

A ramp generator module 180 increases the ramp voltage at a ramp rate. The ramp rate is a voltage increase per unit time. The ramp rate may be a fixed predetermined value or, as discussed further below, the ramp rate may be a variable value.

The ramp generator module 180 monitors the third signal ($D_{Sum}$). When the third signal transitions from the second state to the first state, the ramp generator module 180 sets the ramp voltage to a predetermined reset voltage (e.g., zero Volts) and maintains the ramp voltage at the predetermined reset voltage for a predetermined ramp reset period.

The predetermined ramp reset period is less than a predetermined minimum possible value of the ON periods and may be as close to zero as possible. The predetermined ramp reset period may be, for example, less than ½, less than ⅓, less than ¼, less than ⅕, less than 1/10, less than 1/25, less than 1/50, or less than 1/100 of the predetermined minimum possible value of the ON periods, or another suitable fraction of the predetermined minimum possible value of the ON periods.

The predetermined ramp reset period may be set, for example, based on a propagation delay of the comparator module 160. The propagation delay of the comparator module 160 may correspond to a period for the comparator module 160 to transition the third signal from the first state to the second state or vice versa in response to its inputs. The predetermined ramp reset period being less than the ON periods enables the ON time of multiple phases to overlap in order to more quickly respond to a decrease in the output voltage.

When a large decrease in the output voltage occurs, the compensation voltage may be high for a relatively long period in an effort to increase the output voltage. Therefore, the comparator module 160 would maintain the third signal in the first state during that period. The phase manager module 156 would therefore assert one of the phases for an extended period. The output voltage can be increased more quickly towards the target voltage, however, by asserting multiple phases simultaneously.

One way to assert multiple phases simultaneously is to force additional transitions on the third signal ($D_{Sum}$). For example, the ramp generator module 180 may monitor how long (i.e., a period that) the third signal has been in the first state after the third signal transitions from the second state to the first state. In other words, the ramp generator module 180 may monitor how long the sum of the ramp voltage and the compensation voltage has been greater than the phase voltage.

When the period that the third signal is in the first state is greater (i.e., longer) than a predetermined transient identification period, the ramp generator module 180 may set the ramp voltage to a predetermined comparator resetting voltage for a predetermined comparator reset period. The predetermined comparator resetting voltage may be a voltage that will cause the comparator module 160 to transition the third signal from the first state to the second state. For example only, the predetermined comparator resetting voltage may be a negative voltage. The predetermined comparator reset period may be short and may be, for example, based on the period for the comparator module 160 to transition the third signal from the first state to the second state or vice versa in response to its inputs. This allows the phase manager module 156 to trigger another phase to help increase the output voltage more quickly.

Figure 2:
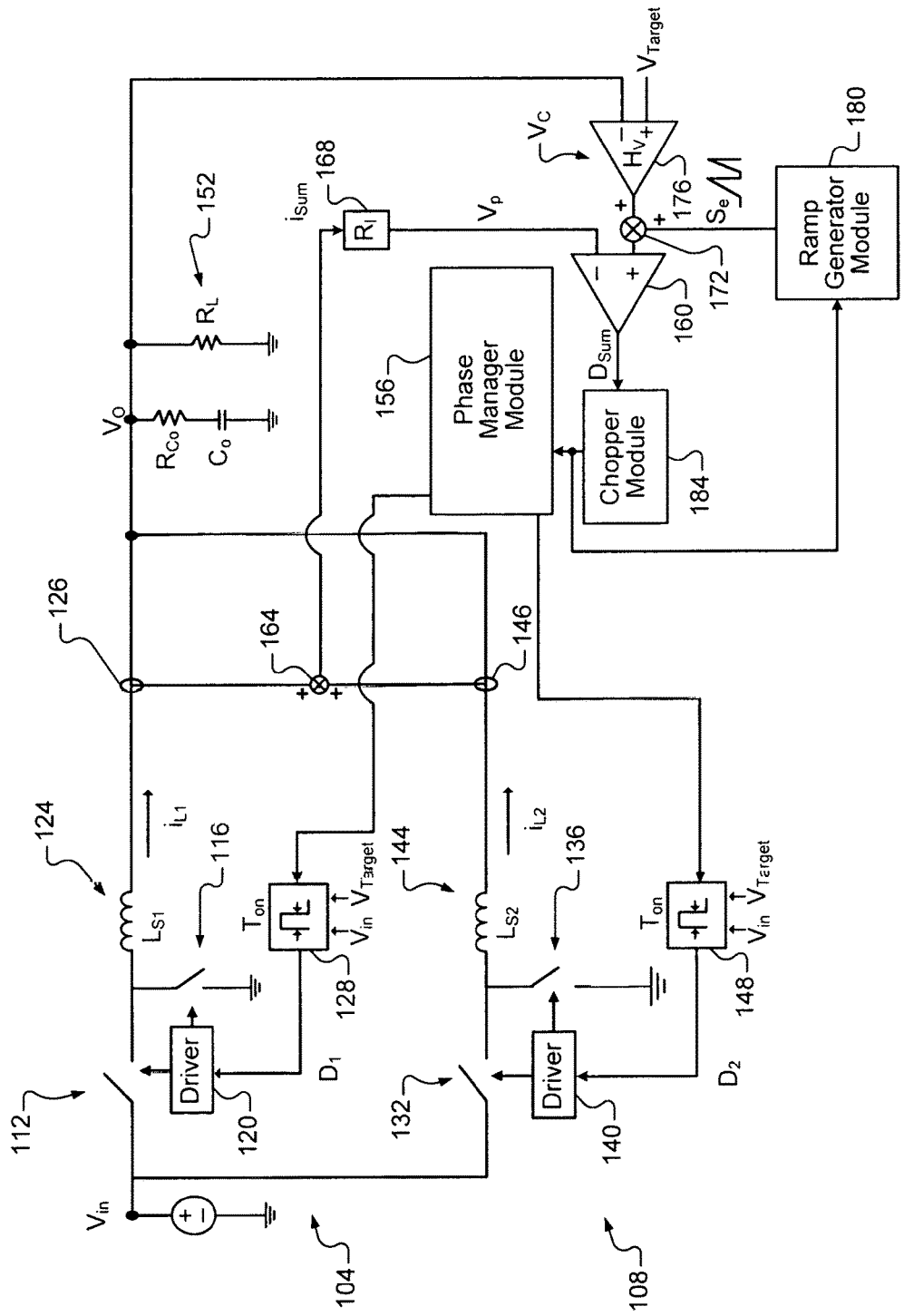

Another way to assert multiple phases simultaneously is to force additional transitions at the input of the phase manager module 156. As shown in FIG. 2, a chopper module 184 may be implemented to generate these additional transitions, thereby forcing the phase manager module 156 to cycle through the phases, asserting each phase in turn. An example of the chopper module 184 is also provided in FIGS. 7A and 7B. The chopper module 184 receives the third signal output by the comparator module 160. When the third signal is in the first state for less than the predetermined transient identification period, the chopper module 184 sets a fourth signal to a first state. When the third signal is in the second state, the chopper module 184 sets the fourth signal to a second state.

When the period that the third signal is in the first state becomes greater than the predetermined transient identification period, the chopper module 184 transitions the fourth signal to the second state for a short predetermined period then transitions the fourth signal back to the first state. This causes the phase manager module 156 to increment to the next phase and trigger the next phase. Extended periods of the third signal (DSUM) being the first state cause the chopper module 184 to repeatedly toggle the fourth signal between the first and second states. This example illustrates how the phase manager module 156 triggers additional phases to help increase the output voltage more quickly.

Figure 3:
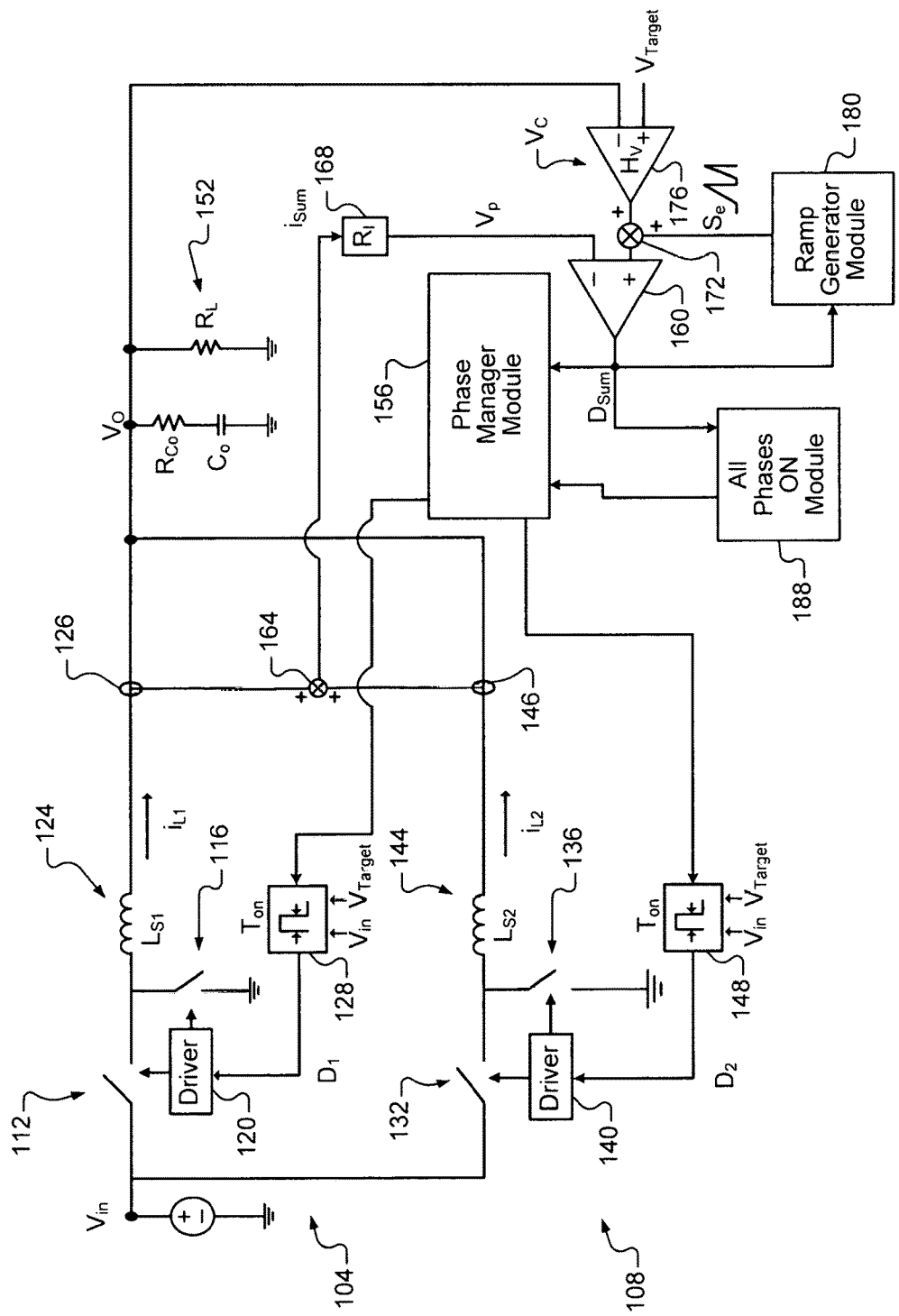
Figure 9A:
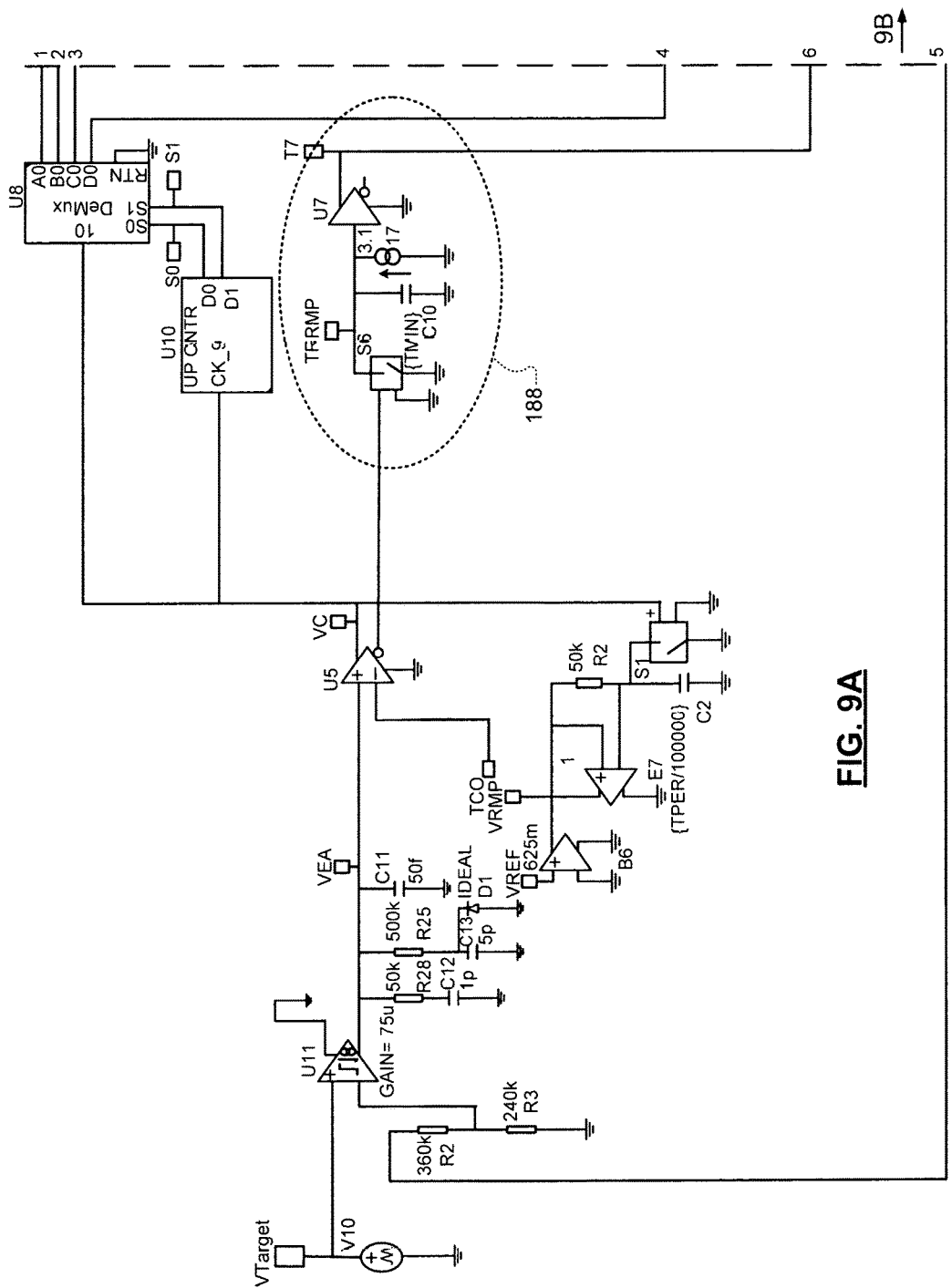
FIGS. 9A and 9B together include a schematic of an example multi-phase DC to DC voltage regulator.
Figure 9B:
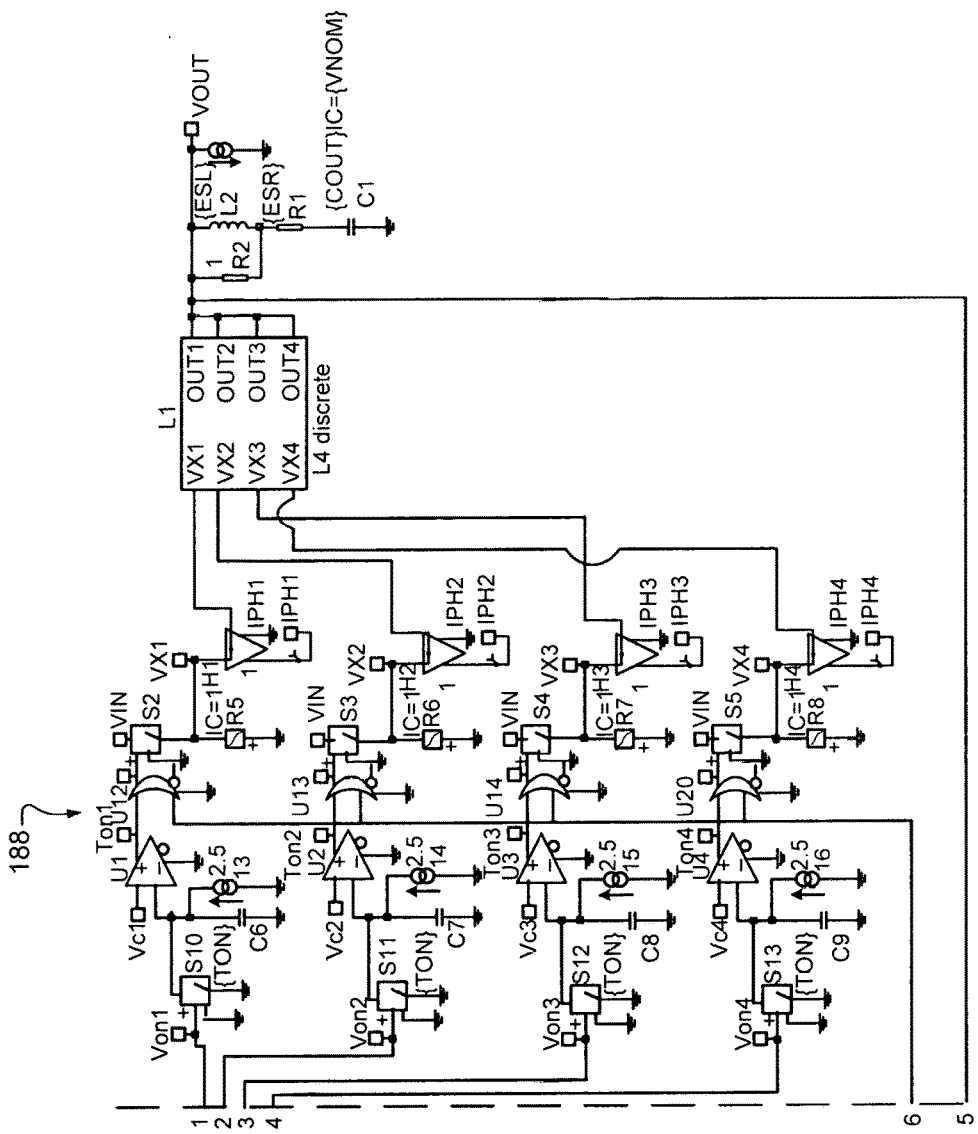

Another way to assert multiple phases simultaneously in response to an increase in load includes an all phases ON module 188, as shown in FIG. 3. An example of the all phases ON module 188 is illustrated in FIGS. 9A and 9B. The all phases ON module 188 monitors the third signal output by the comparator module 160. When the third signal is in the first state for less than the predetermined transient identification period, the all phases ON module sets a fifth signal to a second state. When the third signal is in the second state, the all phases ON module 188 also sets the fifth signal to the second state. However, when the period that the third signal is in the first state becomes greater than the predetermined transient identification period, the all phases ON module 188 sets the fifth signal to a first state.

When the fifth signal is in the first state, the phase manager module 156 triggers all of the phases such that the inductors of each phase are connected to the input voltage. When the fifth signal is in the second state, the phase manager module 156 controls the triggering of the phases individually, as described above, based on the state of the third signal.

Figure 10:
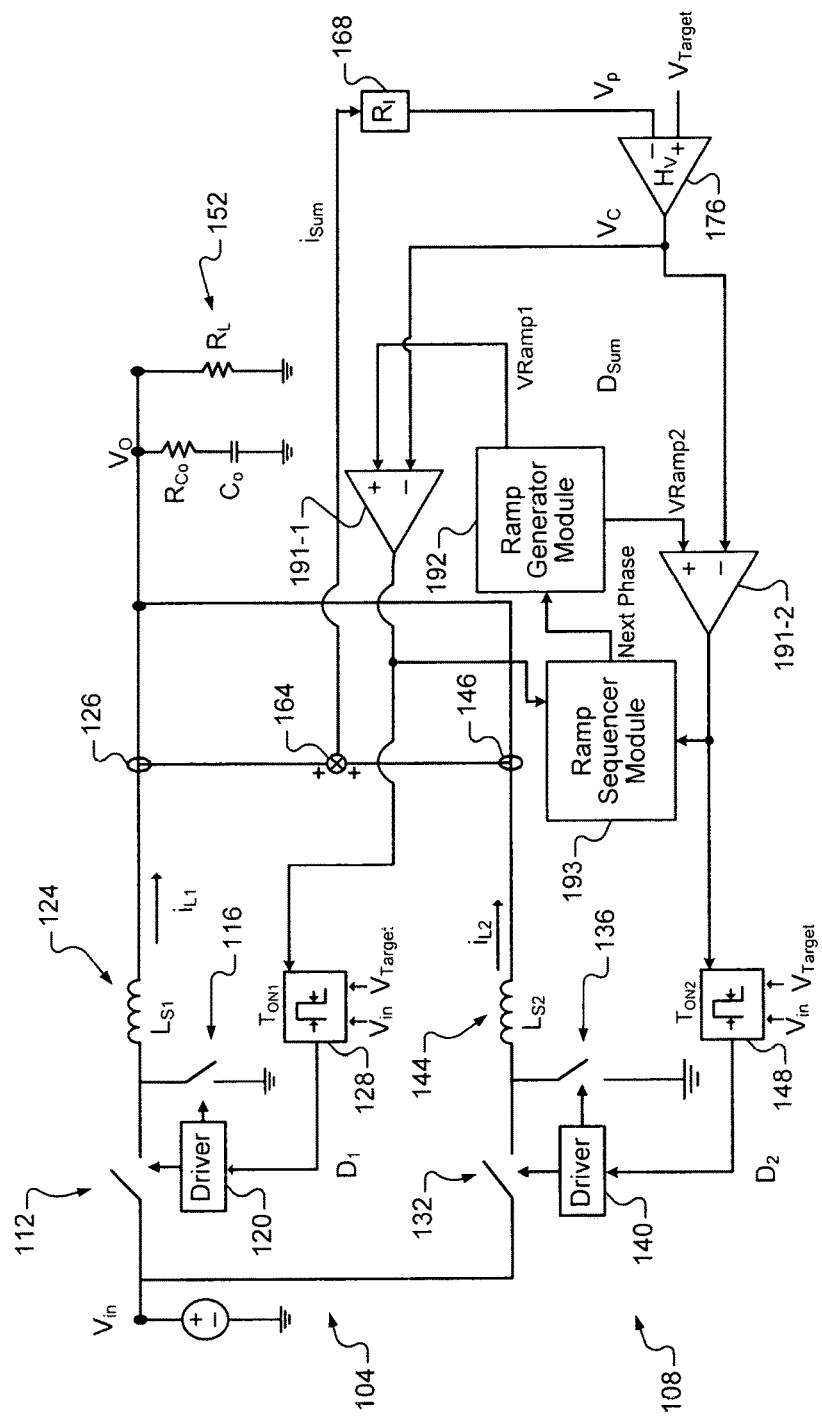
FIG. 10 is a functional block diagram of example multi-phase direct current (DC) to DC voltage regulator.

Yet another way to assert multiple phases simultaneously in response to an increase in load does not require the phase manager module 156 and instead sequences generation of ramps applied to comparators of the phases, respectively. In FIG. 10, one comparator is provided for each phase. For example, comparator 191-1 is provided for the first phase 104 and comparator 191-2 is provided for the second phase 108. Outputs of the comparators trigger the respective pulse generators. For example, the output of the comparator 191-1 transitioning from a second state to a first state may trigger the first pulse generator 128. The output of the comparator 191-2 transitioning from a second state to a first state may trigger the pulse generator 148.

The comparators generate their outputs based on the ramps, respectively, and the compensation voltage ($V_C$). For example, the comparator 191-1 transitions its output from the second state to the first state when the compensation voltage is greater than the ramp voltage of the first phase (VRamp1). The comparator 191-2 transitions its output from the second state to the first state when the compensation voltage is greater than the ramp voltage of the second phase (VRamp2). The comparators may set their outputs to the second state when the compensation voltage is less than the respective ramp voltages. In this example, the compensation voltage module 176 sets the compensation voltage based on a difference between the phase voltage ($V_P$) and the target voltage. For example, the compensation voltage module 176 may set the compensation voltage equal to a product of the predetermined gain ($H_P$) and a difference value, where the difference value is equal to the target voltage minus the phase voltage.

A ramp generator module 192 selectively applies ramps to the comparators of the phases cyclically. In other words, the ramp generator module 192 applies a ramp to each phases comparator once before applying a ramp to that phases comparator again for a second time. For example, the ramp generator module 192 may apply a ramp to the comparator 191-1 of the first phase, later apply a ramp to the comparator 191-2 of the second phase 108, later apply a ramp to a comparator of a third phase, and so on. Once a ramp has been applied to the last phase's comparator, the ramp generator module 192 may start over with the comparator of the first phase 104. While the example of addressing the phases in numeric order has been provided, the ramps may be applied to the respective comparators of the phases in another suitable order.

Figure 11:
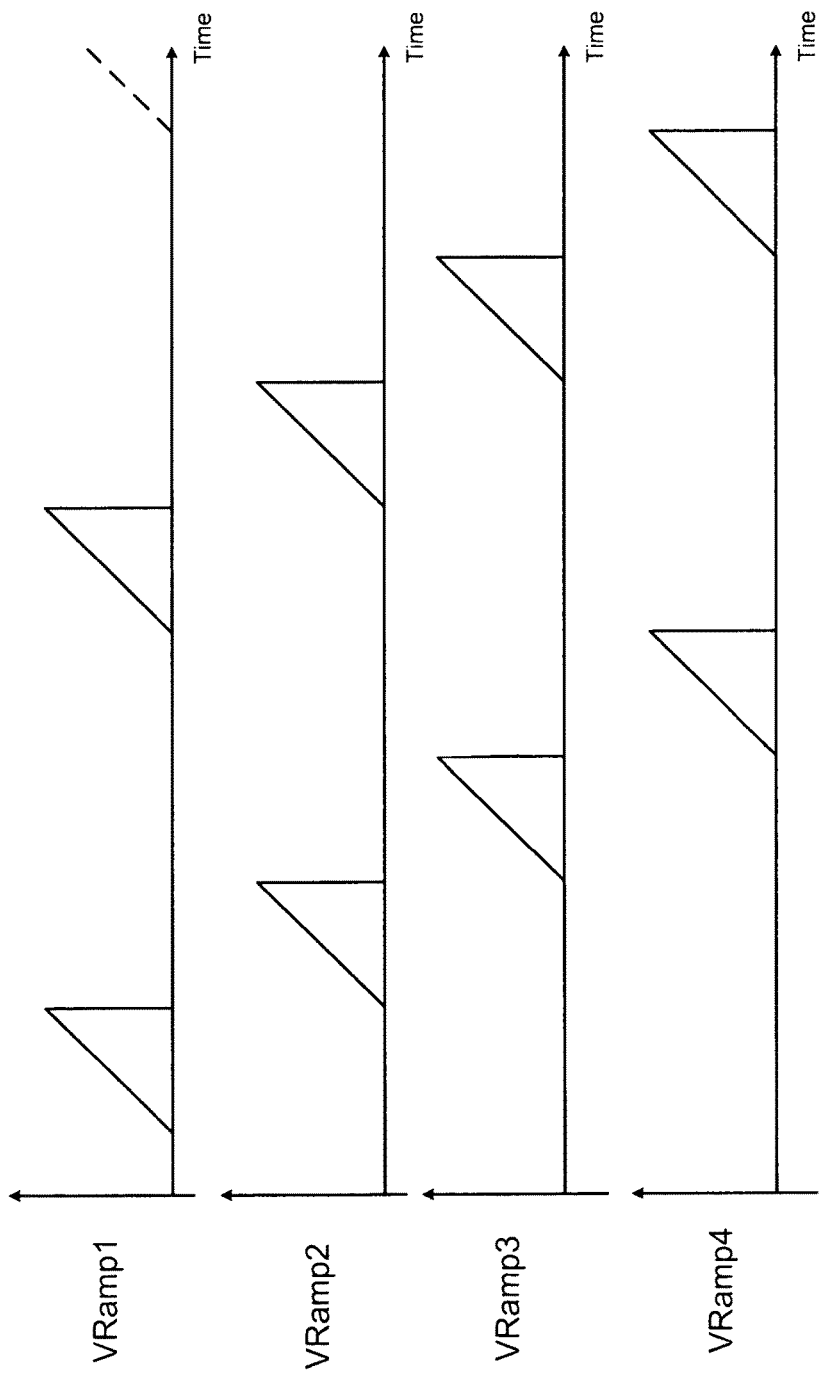
FIG. 11 is an example graph of ramp voltages applied to comparators of respective phases.
Figure 12A:
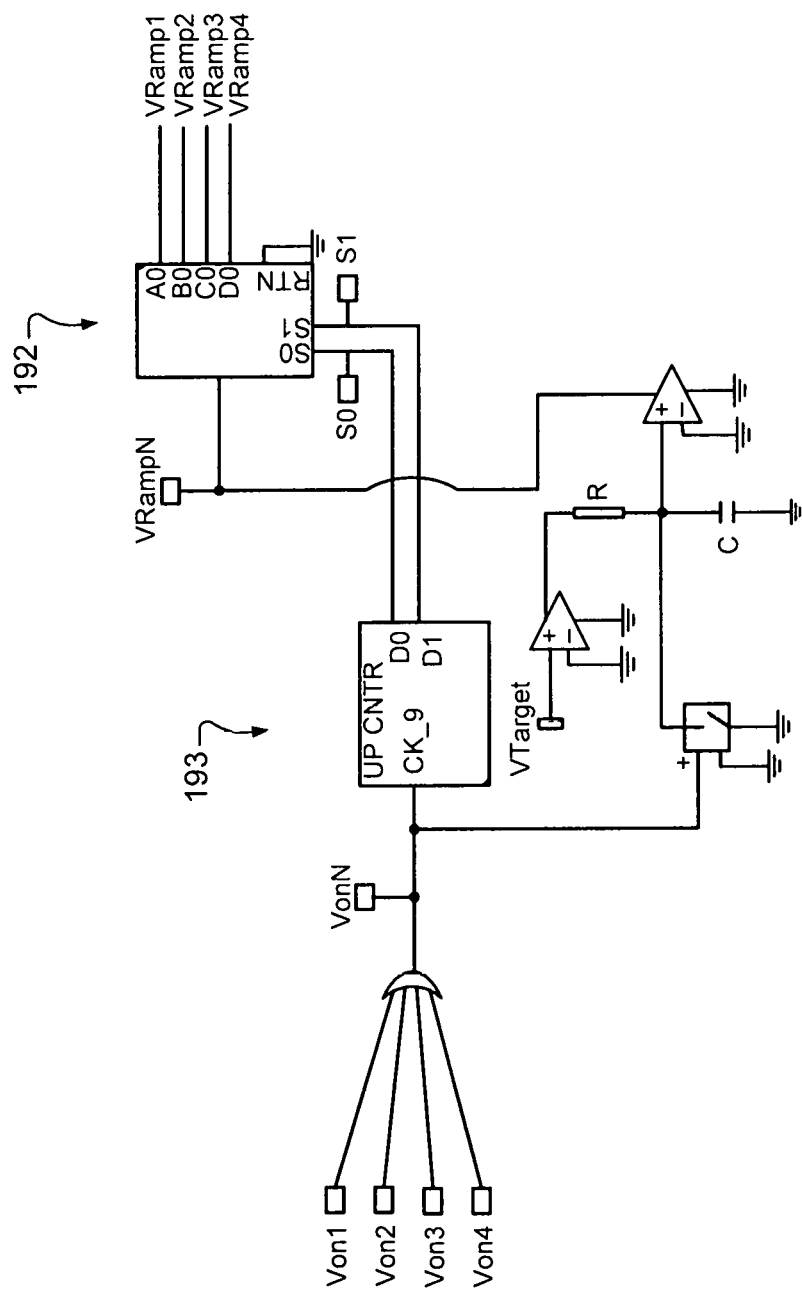
FIGS. 12A-12C together include a schematic of an example multi-phase DC to DC voltage regulator.
Figure 12B:
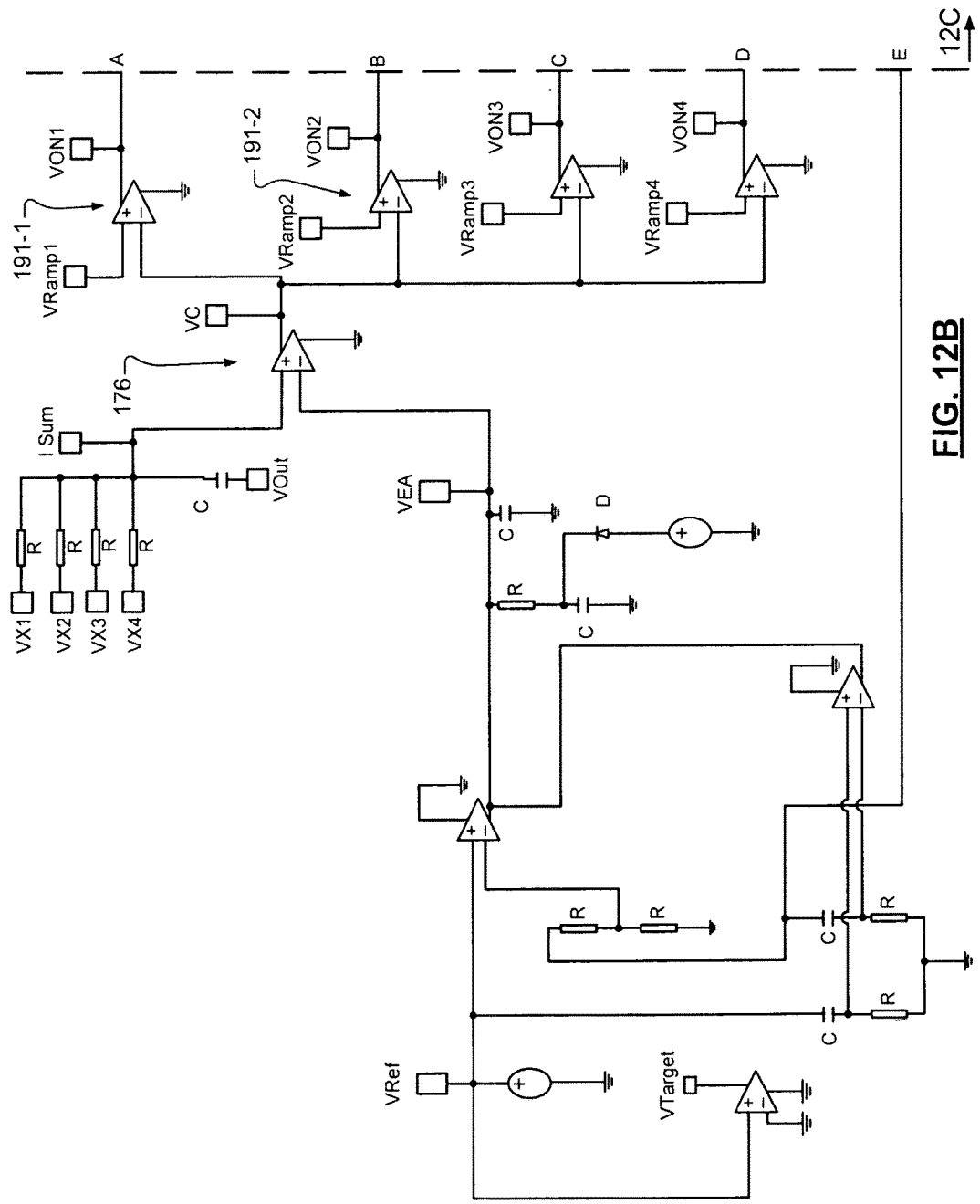
Figure 12C:
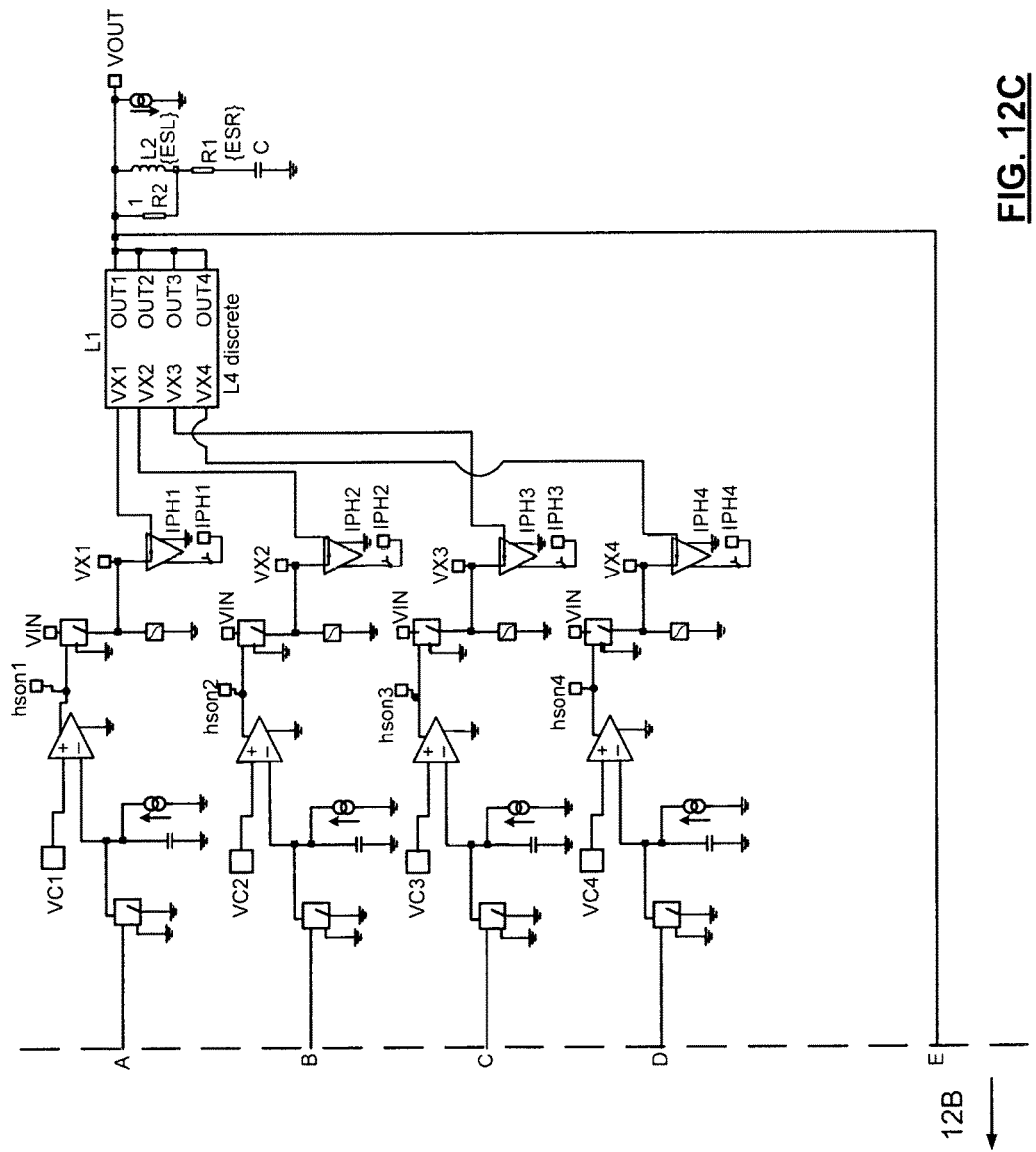

A ramp sequencer module 193 may be used to track and indicate which phase is next to receive a ramp. In another example, the ramp generator module 192 may track which phase is next to receive a ramp, and the ramp sequencer module 193 may be omitted. In yet another example, a ramp generator module may be provided for each phase, and the ramp sequencer module 193 may trigger the ramp generator modules of the phases to begin generating their respective ramps. FIG. 11 includes an example graph of ramp voltages applied to the comparators of the respective phases in a predetermined order. Ramping may refer to the adjustment of a ramp voltage. Examples of the ramp generator module 192 and the ramp sequencer module 193 are provided in FIGS. 12A-12C.

The ramp generator module 180 (or the ramp generator module 192) may vary the ramp rate in various implementations. For example, the ramp generator module 180 may vary the ramp rate based on the period that the third signal is in the second state. The ramp generator module 180 may, for example, set the ramp rate to a predetermined rate when the third signal transitions to the second state and decrease the ramp rate as the period that the third signal is in the second state increases.

By decreasing the ramp rate, the ramp voltage increases non-linearly. This may decrease the size of changes in the compensation voltage that occur in response to load transients relative to using a fixed ramp rate, for example, during discontinuous mode (DCM) operation. Increasing the ramp voltage non-linearly may therefore improve transient response relative to linearly increasing the ramp voltage as done when using a fixed ramp rate. Example non-linear ramp shapes include quadratic and exponential shapes.

Figure 4:
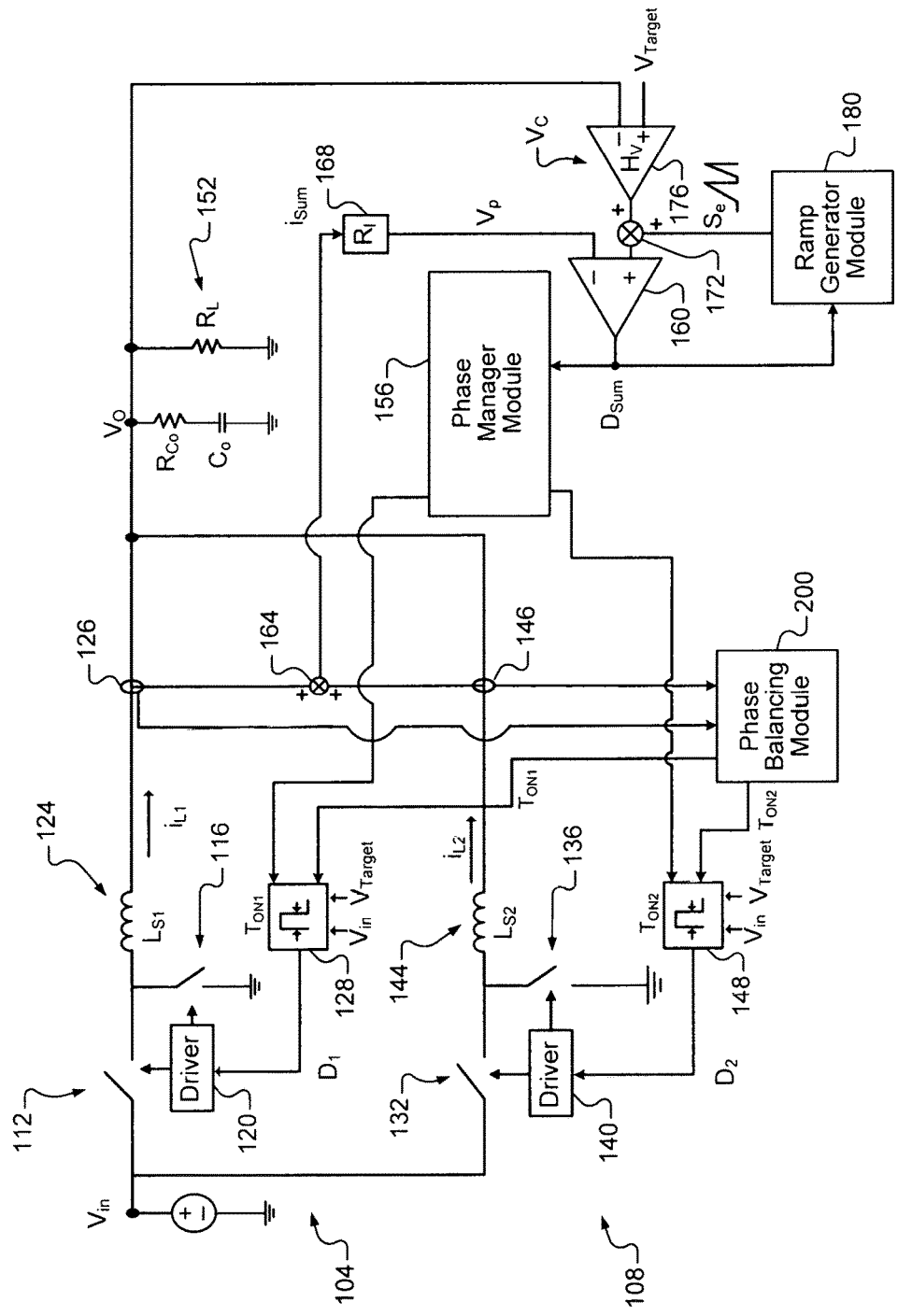

As shown in FIG. 4, a phase balancing module 200 may be implemented. The phase balancing module 200 can be used with FIGS. 1-3, FIG. 10, FIGS. 7A-7B, FIGS. 9A-9B, and FIGS. 12A-12C. The phase balancing module 200 monitors the inductor currents for each phase, such as $i_{L1}$ for the first phase 104 and $i_{L2}$ for the second phase 108. The phase balancing module 200 determines an average phase current based on the inductor currents. The phase balancing module 200 adjusts the ON periods for the phases based on the phases' inductor currents, respectively, and the average phase current.

Figure 5:
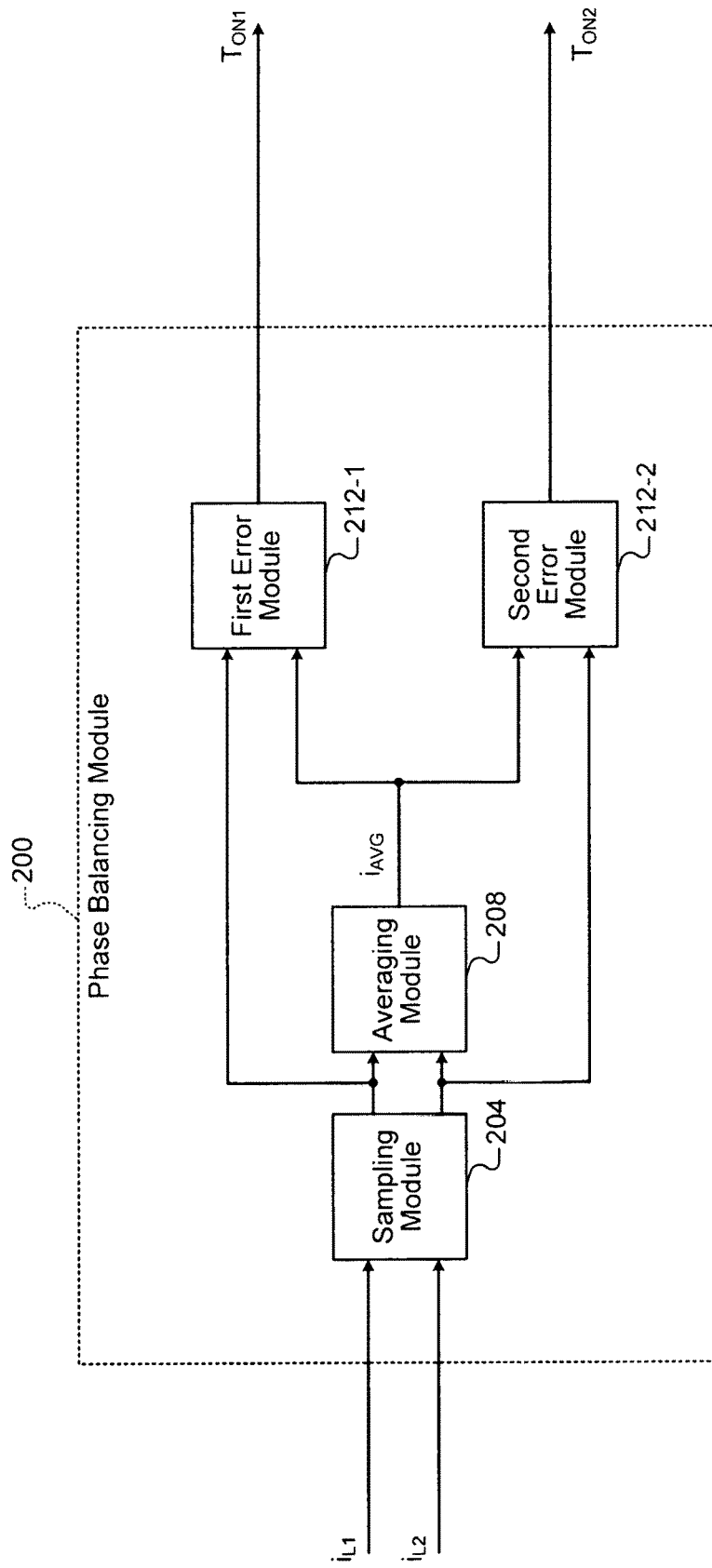
FIG. 5 is a functional block diagram of an example phase current balancing module.
Figure 6:
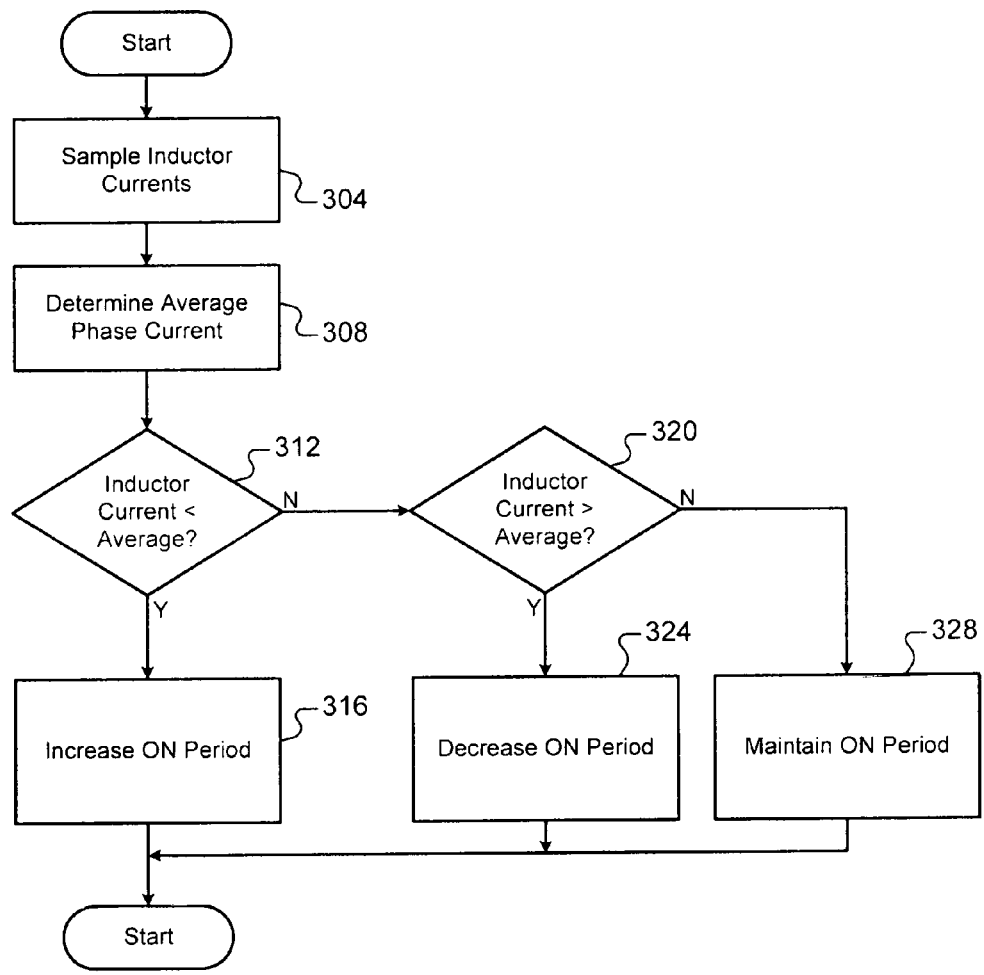
FIG. 6 is a flowchart depicting an example method of balancing phase currents.
Figure 7A:
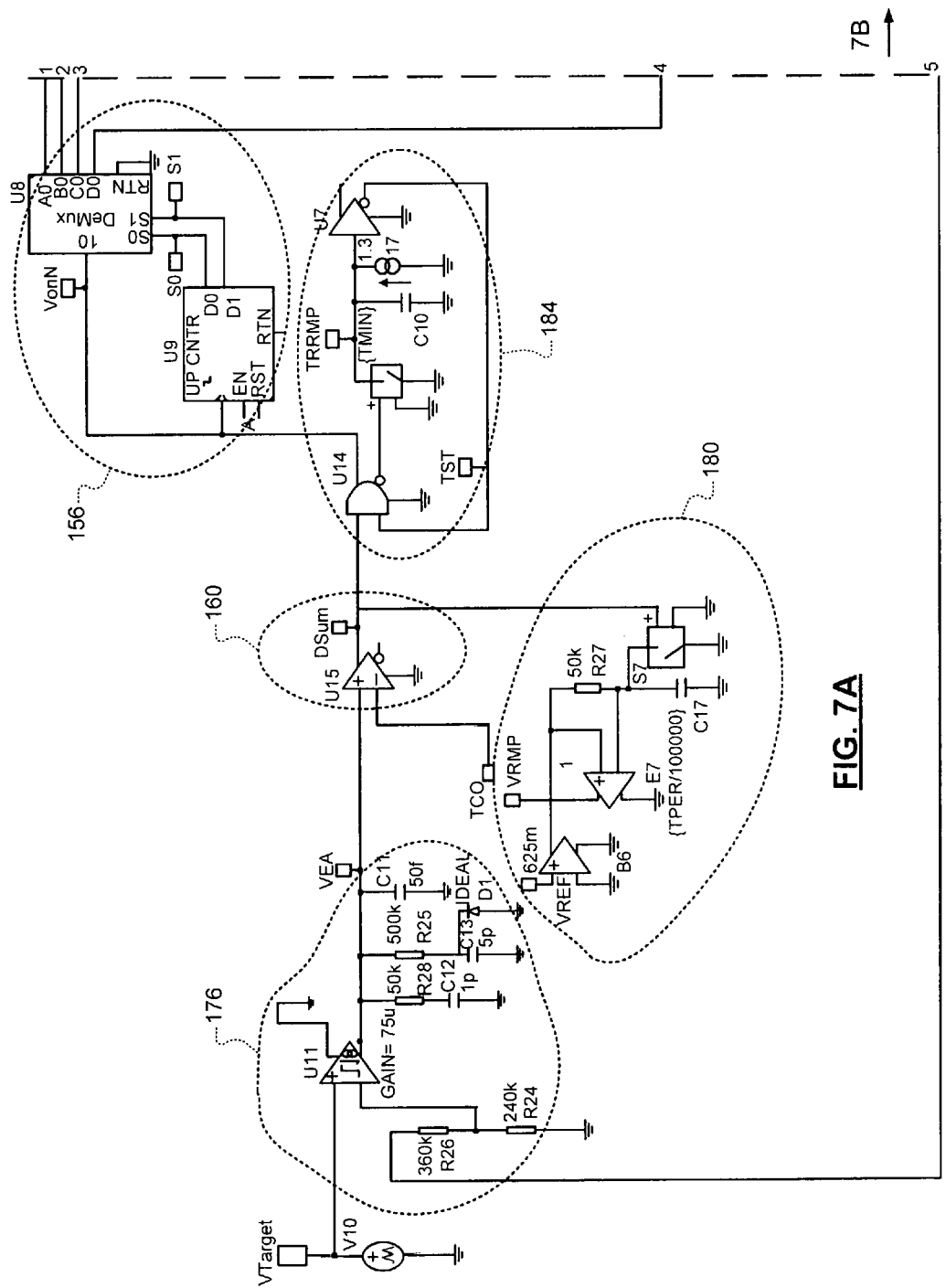
FIGS. 7A and 7B together include a schematic of an example multi-phase DC to DC voltage regulator.
Figure 7B:
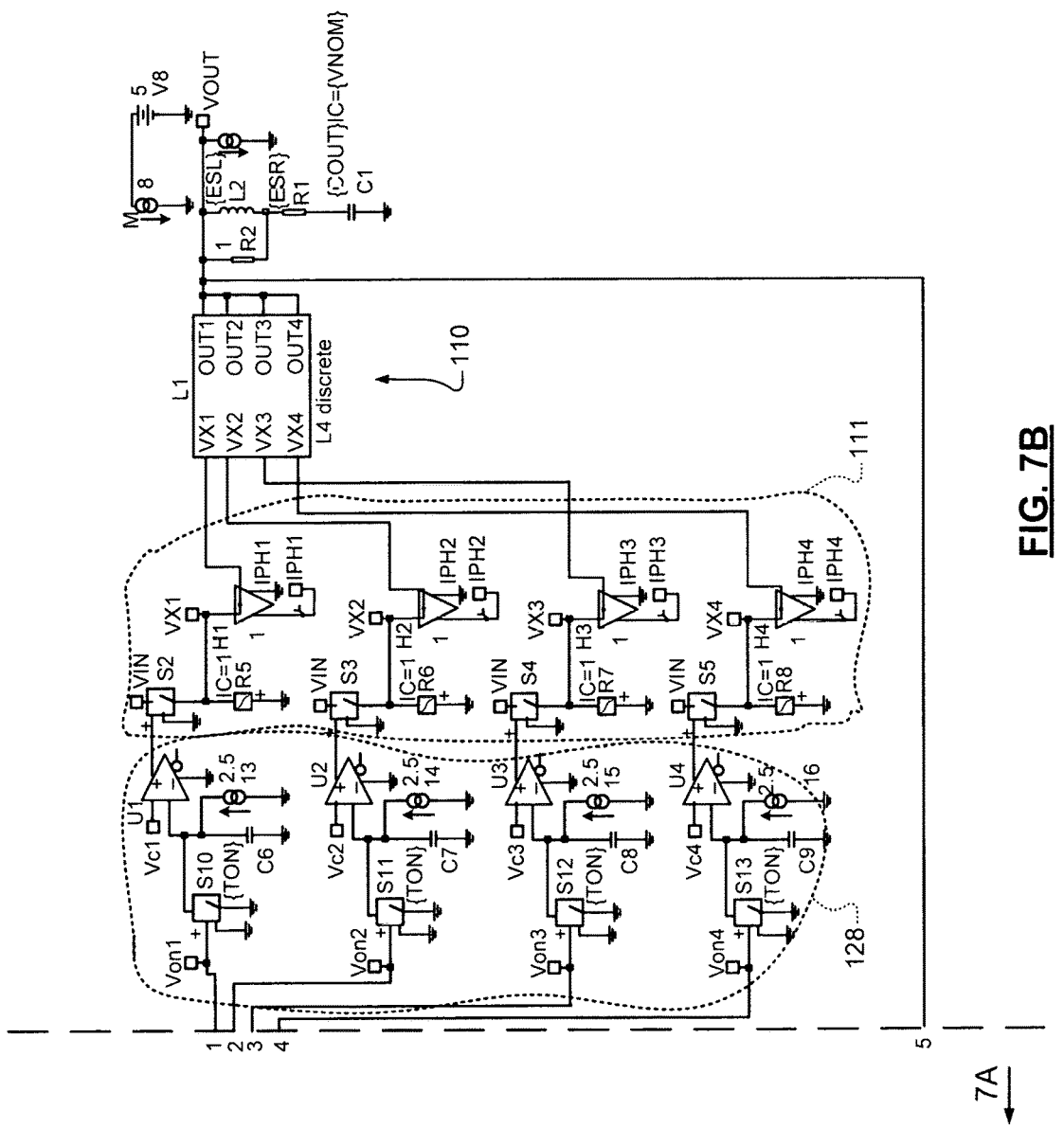

FIG. 5 is a functional block diagram of an example implementation of the phase current balancing module 200. FIG. 6 is a flowchart depicting an example method of balancing the inductor currents of the phases, respectively. While FIG. 6 is shown as ending, FIG. 6 may be performed iteratively at a predetermined rate or, for example, when one or more conditions are satisfied. Alternatively, the balancing may be performed continuously in analog examples.

Figure 8:
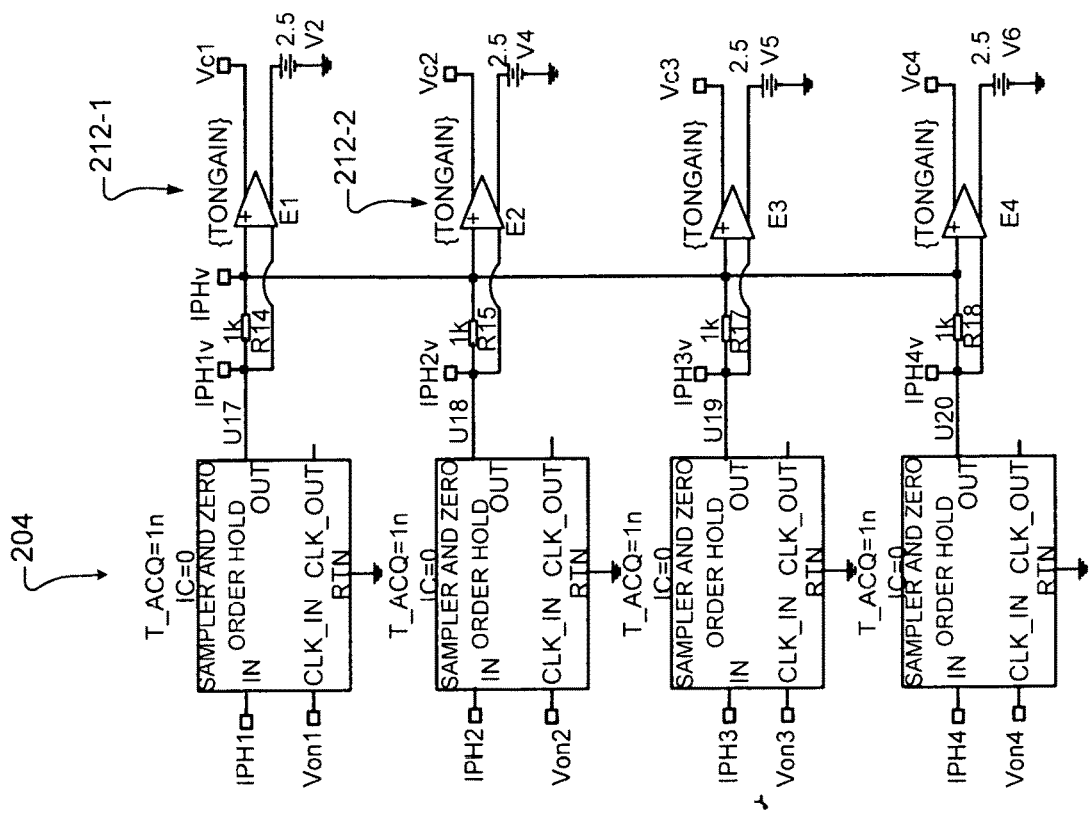
FIG. 8 is a schematic of an example phase current balancing module.

The phase current balancing module 200 includes a sampling module 204 that samples the inductor currents of each of the phases. Sampling of the inductor currents is illustrated by 306 in FIG. 6. An example of the sampling module 204 is provided in FIG. 8. The sampling module 204 samples the inductor currents according to one or respective clock signals. For example, in FIG. 8, sampling of the inductor currents is performed based on respective clock signals, Von1, Von2, Von3, and Von4. In FIG. 8, the sampled current measurements are represented by IPH1V (for the first inductor current of the first phase), IPHV2 (for the second inductor current of the second phase), etc.

An averaging module 208 averages the sampled current measurements to create an average signal that corresponds to an average of the phase currents. In FIG. 8, the average signal is represented by IPHV. The averaging is represented by 308 in FIG. 6.

Error modules determine differences between the sampled current measurements, respectively, and the average. For example, a first error module 212-1 determines a difference between the sampled phase current measurement for the first phase (IPHV1) and the average. A second error module 212-2 determines a difference between the sampled phase current measurement for the second phase (IPHV2) and the average, and so on. The error modules provide the differences to the respective pulse generators to adjust the respective ON periods to balance the phase currents. Setting of an ON period of an ON period generator to balance the phase currents is illustrated by 312-328 in FIG. 6. For example, the first pulse generator 128 may increase the first ON period when the inductor current of the first phase 104 is less than the average, and vice versa. The second pulse generator 148 may increase the second ON period when the inductor current of the second phase 108 is less than the average, and vice versa.

In various implementations, the ON periods of the phases may be set based on adjusting the inductor currents of the phases, respectively, toward the inductor current of a selected one of the phases. In this example, the ON period of the selected one of the phases may be maintained, while the ON periods of the other phases are increased or decreased to adjust the inductor currents of the other phases, respectively, toward the inductor current of the selected one of the phases. The above balances the inductor currents of the phases.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, Smalltalk, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A method of voltage regulating, comprising:
in response to a first signal, using a first pulse generator, closing a first switching device for a first period, the first switching device opening and closing to connect and disconnect a first end of a first inductor of a first phase of a voltage regulator to and from an input voltage, wherein a second end of the first inductor being connected to a load;
in response to a second signal, using a second pulse generator, closing a second switching device for a second period, the second switching device opening and closing to connect and disconnect a first end of a second inductor of a second phase of the voltage regulator to and from the input voltage, wherein a second end of the second inductor being connected to the load;
selectively generating one of the first and second signals when a third signal is in a first state;
selectively setting the third signal to the first state based on a ramp voltage;
resetting the ramp voltage to a predetermined reset voltage when the third signal transitions from a second state to the first state;
maintaining the ramp voltage at the predetermined reset voltage for a predetermined ramp reset period after the resetting; and increasing the ramp voltage after the predetermined ramp reset period,
wherein the predetermined ramp reset period is less than a predetermined minimum value of the first and second periods.

2. The method of claim 1 wherein the predetermined ramp reset period is less than 1/10th of the predetermined minimum value of the first and second periods.

3. The method of claim 1 wherein increasing the ramp voltage includes increasing the ramp voltage at a predetermined linear rate.

4. The method of claim 1 wherein increasing the ramp voltage includes the ramp voltage according to a predetermined non-linear shape.

5. The method of claim 1 wherein increasing the ramp voltage includes the ramp voltage according to a ramp rate and adjusting the ramp rate based on a period that the third signal is in the second state after the third signal transitions from the first state to the second state.

6. The method of claim 5 further comprising decreasing the ramp rate as the period that the third signal is in the second state increases.

7. The method of claim 1 further comprising generating both the first and second signals when the third signal is in the first state for greater than a predetermined period.

8. The method of claim 7 further comprising directly closing the first and second switching devices for greater than the first and second periods when the third signal is in the first state for greater than a predetermined period.

9. The method of claim 1 further comprising setting the ramp voltage to a predetermined negative voltage that is less than the predetermined reset voltage when the third signal is in the first state for greater than a predetermined period.

10. The method of claim 1 further comprising:
toggling a fourth signal between a first state and a second state when the third signal is in the first state for greater than a predetermined period;
maintaining the fourth signal in the second state when the third signal is in the first state for less than the predetermined period; and
selectively generating one of the first and second signals each time that the fourth signal transitions to the first state.

11. The method of claim 1 further comprising selectively adjusting at least one of the first period and the second period.

12. The method of claim 11 wherein the selectively adjusting includes selectively adjusting the first period based on a first current from the first inductor to the load.

13. The method of claim 12 wherein the selectively adjusting includes increasing the first period when the first current is less than an average per-phase current to the load.

14. The method of claim 12 wherein the selectively adjusting includes increasing the first period based on a difference between the first current and an average per-phase current to the load.

15. The method of claim 12 wherein the selectively adjusting includes decreasing the first period when the first current is greater than an average per-phase current to the load.

16. The method of claim 15 wherein the selectively adjusting includes decreasing the first period at a predetermined rate when the first current is greater than the average per-phase current to the load.

17. The method of claim 16 wherein the selectively adjusting includes decreasing the first period based on a difference between the first current and the average per-phase current to the load.

18. The method of claim 1 further comprising:
determining a total current based on a sum of first and second currents from the first and second inductors, respectively, to the load;
determining a phase voltage based on the total current and a predetermined value; and
setting the third signal to the first state when a sum of the ramp voltage and a compensation voltage is greater than the phase voltage.

19. The method of claim 18 further comprising determining the compensation voltage based on an output voltage to the load and a target voltage.

20. The method of claim 19 further comprising setting the compensation voltage based on the target voltage minus the output voltage.

21. The method of claim 1 further comprising:
increasing the ramp voltage according to a ramp rate; and
selectively adjusting the ramp rate based on an output voltage to the load.

* * * * *

UNITED STATES PATENT AND TRADEMARK OFFICE
CERTIFICATE OF CORRECTION

PATENT NO. : 9,882,483 B2
APPLICATION NO. : 15/330851
DATED : January 30, 2018
INVENTOR(S) : Serhii M. Zhak et al.

Page 1 of 1

It is certified that error appears in the above-identified patent and that said Letters Patent is hereby corrected as shown below:

In the Specification

| | |
|---|---|
| Column 6, Line 14 | Delete "(D1)" and insert -- ($D_1$) -- |
| Column 6, Line 32 | Delete "(D2)" and insert -- ($D_2$) -- |
| Column 8, Line 38 | Delete "(DSUM)" and insert -- ($D_{Sum}$) -- |
| Column 10, Line 37 | Delete "(IPHV2)" and insert -- (IPH2V) -- |
| Column 10, Line 48 | Delete "(IPHV1)" and insert -- (IPH1V) -- |
| Column 10, Line 50 | Delete "(IPHV2)" and insert -- (IPH2V) -- |

Signed and Sealed this
Tenth Day of April, 2018

Andrei Iancu
*Director of the United States Patent and Trademark Office*